No. 635,492. Patented Oct. 24, 1899.
R. F. LIVERMORE.
DEVICE FOR MEASURING BOLTS OF CLOTH.
(Application filed Feb. 15, 1898.)
(No Model.)
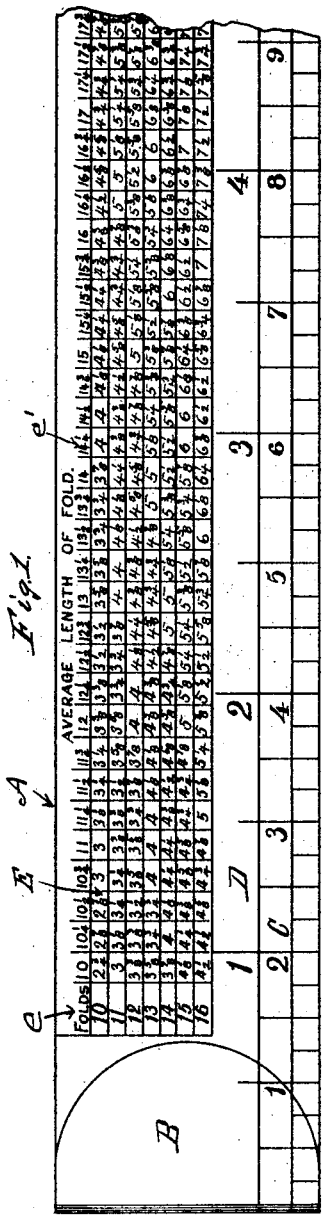
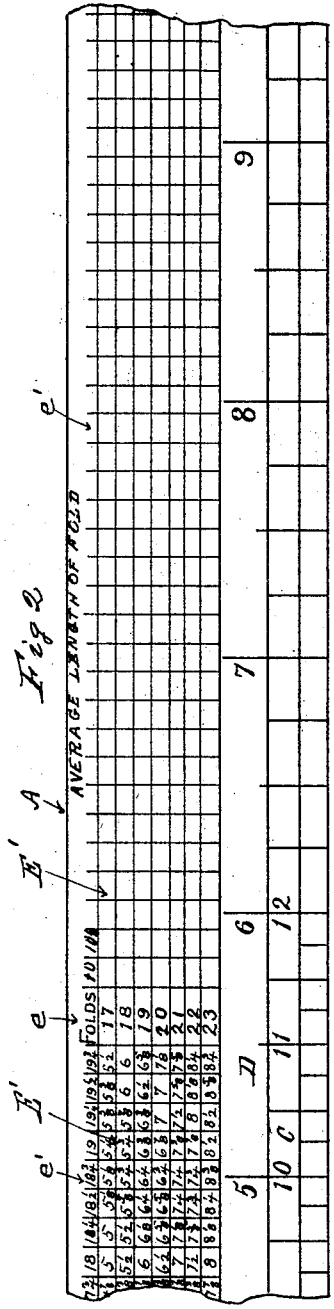
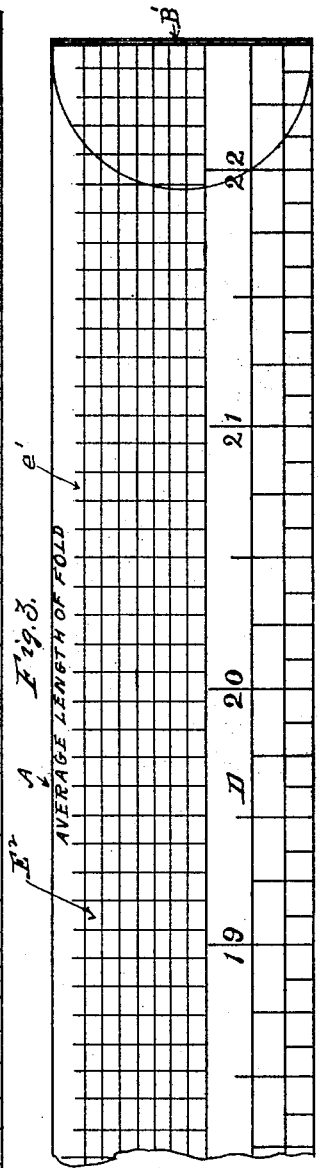
WITNESSES:
A. L. Jackson
F. J. B. Smith
INVENTOR
Ray F. Livermore
BY
ATTORNEY

UNITED STATES PATENT OFFICE.

RAY F. LIVERMORE, OF CORRY, PENNSYLVANIA.

DEVICE FOR MEASURING BOLTS OF CLOTH.

SPECIFICATION forming part of Letters Patent No. 635,492, dated October 24, 1899.

Application filed February 15, 1898. Serial No. 670,371. (No model.)

*To all whom it may concern:*

Be it known that I, RAY F. LIVERMORE, a citizen of the United States, residing at Corry, in the county of Erie and State of Pennsylvania, have invented certain new and useful Improvements in Systems and Mechanism for Measuring Bolts of Cloth; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to a system and mechanism for measuring bolts of cloth; and it consists, substantially, of taking the width and thickness of the board on which the bolt of cloth is rolled, in inches, then measuring the circumference of the bolt and adding the width and thickness of the board to half of the circumference of the bolt, in inches, which gives the average length of each turn of cloth in the bolt, and then multiplying this amount by the number of turns of the cloth in the bolt and dividing the product by thirty-six, the result being the number of yards in the bolt. In case, however, the cloth is not wound on a board, but rolled from a central point, then I only measure the circumference of the bolt, in inches, and multiply one-half that amount by the number of turns in the bolt and divide by thirty-six, as before, and the result will be the number of yards in the bolt.

The mechanism I have devised for conveniently carrying out this system of measuring bolts of cloth consists, substantially, of a flexible measure, graduated with one scale for measuring the width and thickness of the board the unit of which is one inch and with another scale for measuring the circumference of the bolt the unit of which is two inches, and a computation-table showing at a glance the aggregate number of yards in a bolt of any ascertained average length of turns of cloth multiplied by the number of turns in such bolt, as hereinafter fully described and set forth, and illustrated in the accompanying drawings, in which—

Figure 1 shows a section of the beginning of the measure with a section of the computation-table thereon. Fig. 2 shows an adjoining section of the same. Fig. 3 shows the last end section of the same.

In the drawings, A is flexible measure, preferably provided with clips of metal B B' on the ends thereof. Commencing at the end B on one edge of the measure A, there is a scale C in inches and fractions of inches for measuring the width and thickness of the board upon which the bolt is rolled, and above this scale C there is another scale D, divided into two inches and fractions thereof, for the purpose of measuring the circumference of the bolt, the units of the scale C being one inch and designated by figures "1," "2," "3," &c., and the units of the scale D being two inches and designated by larger figures "1," "2," "3," &c. Upon the measure A there is also placed a computation-table in convenient sections E E' E², &c., one section E thereof being carried out fully thereon. At the left-hand end of this table there is a vertical row of figures $e$, showing number of turns or folds in bolts of cloth, and across the top of the table is a row of figures $e'$, showing average lengths of such turns or folds, and the remaining figures on the table show amounts in yards of the contents of such bolts.

In operation the operator takes the measure and by means of the scale C measures the width and thickness of the board upon which the bolt is rolled, which amounts, say, for example, to eight inches. He then by means of the scale D measures the circumference of the bolt, which the figures on said scale show to be nine, which, added to the aggregate width and thickness of the board, eight, equals seventeen, the average length of each fold. He then counts the number of folds of cloth in the bolt and finds that there are fifteen. Then he refers to the table E, and in the left-hand column, under the word "Folds," finds the figures "15." He then looks at the first row of figures across the top of the table under the words "Average length of fold" and finds the figures "17." Then by following down the column of figures thereunder until the lines corresponding with the figures "15" are found he finds seven and one-eighth yards, the number of yards in the bolt.

The foregoing is a fair example of the operation of this mechanism in carrying out my system of measuring bolts of cloth without unrolling them.

I have shown only a portion of the computation-table in the drawings; but it is manifest that it can be carried out to any desired extent. It is also manifest that, if desired, the computation-table can be placed on the obverse side of the flexible measure A with equal facility, or, if desired, it could be placed on a card separate from the measure itself.

Having thus described my invention, so as to enable others to make and use the same, what I claim as new, and desire to secure by Letters Patent of the United States, is—

A measure for obtaining the length of bolts of cloth without unrolling them, comprising a band of flexible material provided at one edge with a scale extending the length of the band and measuring two inches as a unit, a plane surface for tables giving the average length of fold on the remaining portion of the band, and a second scale measuring inches as a unit and extending for a fraction of the length of the band and arranged at the left-hand end portion of the first said scale, substantially as described and shown.

In testimony whereof I affix my signature in presence of two witnesses.

RAY F. LIVERMORE.

Witnesses:
P. PHILIPS,
JAS. L. WEST.